July 3, 1934.  G. W. HEINTZ  1,965,287
EQUIPMENT FOR DOG RACE TRACKS
Filed Sept. 11, 1933
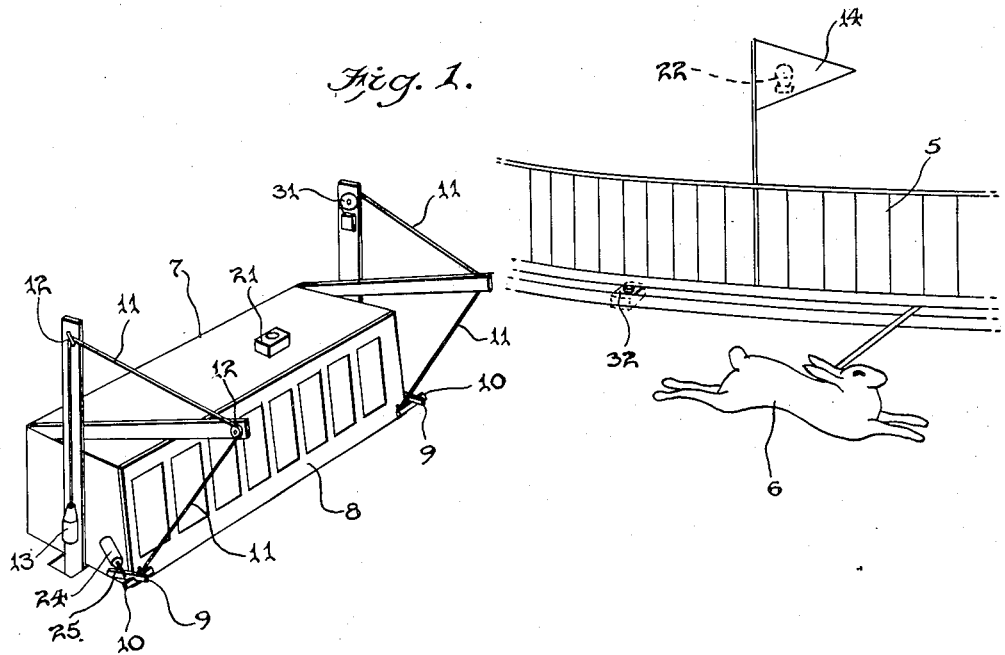
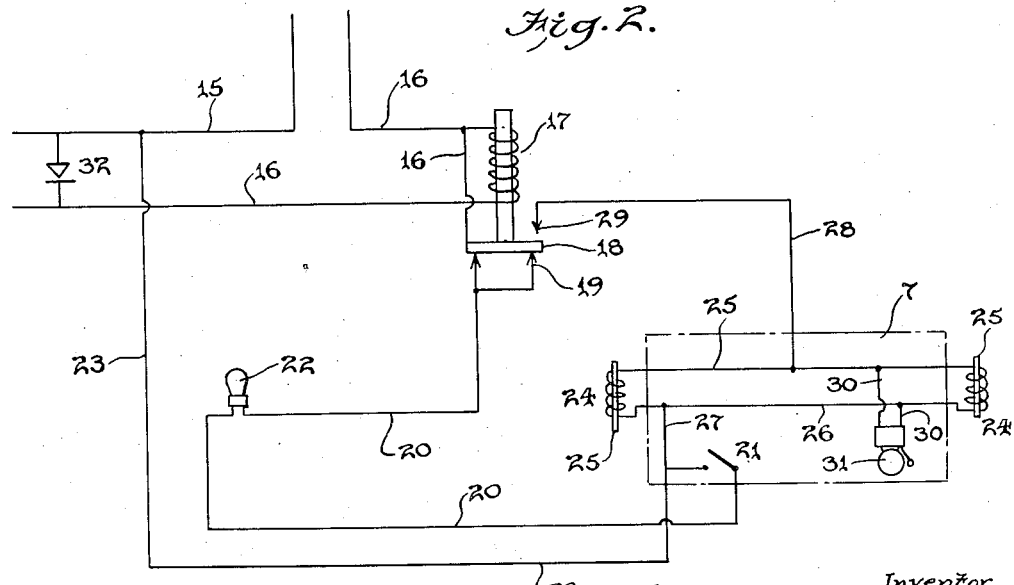
Inventor
George W. Heintz
By James Atkins.
Attorney Patented July 3, 1934

1,965,287

UNITED STATES PATENT OFFICE 1,965,287

EQUIPMENT FOR DOG RACE-TRACKS

George W. Heintz, Menlo Park, Calif.

Application September 11, 1933, Serial No. 689,004

5 Claims. (Cl. 272—4)

This invention relates to improvements in equipment for dog race tracks, and the primary object of the invention is to provide an arrangement which will assure the simultaneous release of all the dogs participating in the race at a predetermined moment following the passage of the lure past the box ordinarily provided for housing and releasing the dogs at the start of the race.

A further object of the invention is the provision of an arrangement in which the release of the starting box door is effected electrically in response to the movement of the lure, and in which both visible and audible indicating means are operated simultaneously with the release of the dogs from the starting box.

A still further object of the invention is to interconnect the circuits of the visible signal indicating the start of the race with the circuit of the starting box door release, whereby the latter circuit is operated instantaneously upon interruption of the circuit of the indicator.

With the foregoing objects outlined and with other objects in view which will appear as the description proceeds, the invention consists in the novel features hereinafter described in detail, illustrated in the accompanying drawing, and more particularly pointed out in the appended claims.

In the drawing,

Fig. 1 is a fragmentary perspective view of a dog race track, illustrating the starting box and moving lure, and showing the invention as applied thereto.

Fig. 2 is a diagrammatic view of the electrical circuit, including the visible and audible indicators and door release circuit.

Referring to the drawing, a portion of a race track is represented in Fig. 1, in which the numeral 5 indicates a fragment of the guard for the track along which the usual carriage is driven at high speeds and operates the lure 6. The starting box 7 is located in proper relation to the rail 5, and as usual in such cases, the front thereof is constituted by a hinged door 8, the box being divided internally by partitions to form stalls in which the several dogs are housed before the start of the race. The door is normally locked in closed position by pivoted latch members 9 coacting with studs 10 provided at both ends of the door 8. The door 8 may be opened either manually by the manipulation of suitable cables provided for that purpose, or it may be opened automatically when released by springs or by means of actuating cables 11 trained over pulleys 12 mounted on suitable supporting arms, each cable being connected at one end with the door and attached at its opposite end to a weight 13.

According to the invention, a visible indicator 14 is provided at a suitable point along the race track, preferably adjacent the starting box 7, and the indicator is preferably elevated and so located as to be within the full view of the race track audience. In the embodiment herein illustrated, the indicator is in the form of a flag, and is illuminated by means which will be hereinafter more fully described.

Referring now to the diagram illustrated in Fig. 2, the numerals 15 and 16 indicate conductors which are connected with a suitable source of supply and with the coil of a relay 17, the armature 18 of which normally engages a contact 19 and is connected with the conductor 16. The contact 19 is connected by a conductor 20 with a switch 21 located within convenient reach of the attendant of the starting box 7, and an indicating lamp 22 is interposed in the conductor 20 and is located within the indicating flag 14 so as to illuminate the latter when the indicator circuit is closed. The opposite pole of the switch 21 is connected by a conductor 23 with the second conductor 15 connected with the current source.

Thus the circuit of the lamp 22 is normally closed from the conductor 16 through the armature 18, contact 19, conductors 20, switch 21, conductor 23 to the conductor 15. The indicator circuit, however, is under the control of the attendant of the starting box, and may be closed and opened at will by operation of the switch 21.

At the opposite sides of the box 7, electromagnetic release devices 24 are provided, each of which includes an armature 25 connected with one of the latch members 9, whereby, when the magnetic release devices are energized, the latches are automatically released and the door 8 is free to move to open position. The coils of the solenoids 24 are connected in parallel by conductors 25 and 26, the conductor 26 being connected over a conductor 27 to the conductor 23 and by the latter to the supply conductor 15.

The other conductor 25, associated with the magnet coils is connected by a conductor 28 with a contact 29 which is engaged by the armature 18 when the relay 17 is energized, and thus, when the relay is in the energized condition, the circuit of the magnetic release devices is closed from the conductor 16 over the armature 18 and contact 29, conductors 28, 25, 26, 27 and 23 to the other current supply conductor 15. In this manner, the release devices 24 are energized and the latch members 9 are moved to release and permit opening movement of the door 8.

Conductors 30 are branched off the conductors 25 and 26 and are connected with an audible signal 31 which affords the attendant of the starting box an additional indication of the actuation of the release devices 24.

The actuation of the relay 17 is effected by a switch 32 which is located along the track of the carriage for the lure 6, and is actuated by the lure carriage during its travel. The switch 32 is shunted across the conductors 15 and 16, and when actuated, closes the circuit of the coil of the relay 17, thereby energizing the latter.

Prior to the start of a race, the lamp 22 illuminating the indicating flag 14 is energized by the attendant upon closing the switch 21, and this indication is a notification of the fact that a race is about to start. The location of the switch 32 is suitably selected with respect to the box 7, and when the lure 6 is set in operation, it passes and operates the switch 32, thereby energizing the relay 17 and closing the circuit of the magnetic release devices 24, as above described.

The energization of the relay 17 simultaneously opens the circuit of the indicating lamp 22 between the armature 18 and the contact 19, and the lamp is thus put out of operation. The energization of the release devices 24 effects the operation of the latch members 9, and the latter release the door 8, permitting the door to be opened either manually by the attendant or automatically by means of suitable actuating mechanism, as for instance, by the weights 13. In addition to the notification afforded the attendant of the release of the starting box door by means of the extinction of the lamp 22, he is also audibly notified by operation of the signal bell 31.

From the foregoing it is believed that the construction, operation and advantages of the invention may be readily understood by those skilled in the art, and it is apparent that changes may be made in the details disclosed, without departing from the spirit of the invention, as expressed in the claims.

What is claimed and desired to be secured by Letters Patent is:

1. In a race track, a starting box and a normally locked door therefore, a movable lure adapted to traverse the track, electromagnetic means actuated by the lure to release the door and permit opening thereof, and a visible indicator automatically put out of operation by said electromagnetic means at the initiation of a race.

2. In a race track, a starting box having a movable door and means normally locking said door in closed position, a movable lure adapted to traverse the track, a visible indicator located at a point on the race track and normally in operative condition, means actuated by the lure to interrupt operation of the indicator, and means associated with the last mentioned means to release said locking means following the interruption in the operation of the indicator.

3. In a race track, a starting box having a movable door and locking means normally retaining the door in closed position, electromagnetic releasing devices associated with said locking means, a movable lure adapted to traverse the track, means actuated by said lure to energize the releasing devices, and indicating devices, means to operate one of said indicating devices simultaneously with the energization of the releasing devices, and the other indicating device being normally operative prior to actuation of the release devices and having its operation interrupted upon actuation of said releasing devices.

4. In a race track, a movable lure adapted to traverse the track, a visible indicator located at a point along the track, a normally closed circuit associated with said indicator, said circuit including a relay, means actuated by said lure to actuate said relay and interrupt the operation of the indicator, a second circuit associated with said relay, a starting box including a movable door and locking means normally retaining said door in closed position, releasing devices associated with said locking means and including coils interposed in the last mentioned circuit, the last mentioned circuit being energized by the relay following operation of the means actuated by the lure.

5. In a race track, a movable lure adapted to traverse the track, a visible indicator located at a point along the track, a normally closed circuit associated with said indicator, said circuit including a relay, means actuated by said lure to actuate said relay and interrupt the operation of the indicator, a second circuit associated with said relay, a starting box including a movable door and locking means normally retaining said door in closed position, releasing devices associated with said locking means and including coils interposed in the last mentioned circuit, the last mentioned circuit being energized by the relay following operation of the means actuated by the lure, a manually operable switch interposed in the first mentioned circuit for controlling operation of the indicator, and a second indicator interposed in the second mentioned circuit.

GEORGE W. HEINTZ.